United States Patent
Lv

(10) Patent No.: US 9,743,816 B2
(45) Date of Patent: Aug. 29, 2017

(54) GLASS-WIPING DEVICE HAVING A SUCTION APPARATUS

(71) Applicant: ECOVACS ROBOTICS CO., LTD., Suzhou (CN)

(72) Inventor: Xiaoming Lv, Suzhou (CN)

(73) Assignee: Ecovacs Robotics Co., Ltd., Suzhou (CN)

( * ) Notice: Subject to any disclaimer, the term of this patent is extended or adjusted under 35 U.S.C. 154(b) by 323 days.

(21) Appl. No.: 14/390,622

(22) PCT Filed: Apr. 3, 2013

(86) PCT No.: PCT/CN2013/073700
§ 371 (c)(1),
(2) Date: Oct. 3, 2014

(87) PCT Pub. No.: WO2013/149584
PCT Pub. Date: Oct. 10, 2013

(65) Prior Publication Data
US 2015/0089763 A1      Apr. 2, 2015

(30) Foreign Application Priority Data

Apr. 5, 2012 (CN) .......................... 2012 1 0097472

(51) Int. Cl.
*A47L 1/02* (2006.01)
*F16B 47/00* (2006.01)

(52) U.S. Cl.
CPC ............... *A47L 1/02* (2013.01); *F16B 47/00* (2013.01); *A47L 2201/00* (2013.01)

(58) Field of Classification Search
CPC .... A47L 1/02; A47L 2201/06; A47L 2201/00; A47L 1/00; A47L 1/06; A47L 11/4044; A47L 2201/04; F16B 47/00
See application file for complete search history.

(56) References Cited

U.S. PATENT DOCUMENTS 5,890,250 A    4/1999  Lange et al.
2003/0048081 A1*  3/2003  Seemann ............... B62D 55/00
                                                                    318/68

FOREIGN PATENT DOCUMENTS

CN        201029844       3/2008
CN        101623868       1/2010
(Continued)

OTHER PUBLICATIONS

European International Search Report to European Patent Application No. 13773165.9, mailed Apr. 16, 2013 (8 pages).
(Continued)

*Primary Examiner* — Robert Scruggs
(74) *Attorney, Agent, or Firm* — Nixon Peabody LLP

(57) ABSTRACT

A suction apparatus and a glass-wiping device with the suction apparatus. The glass-wiping device sucks onto the surface of a glass via the suction apparatus. The suction apparatus comprises a suction cup unit (1). The suction cup unit (1) comprises an inner suction cup (11) and an outer suction cup (12). The inner suction cup (11) is arranged on the inside of the outer suction cup (12), where a chamber on the inside of the inner suction cup (11) forms an inner negative pressure chamber (13) via vacuum suction, and where a chamber between the inner and outer suction cups (11 and 12) forms an outer negative pressure chamber (14) via vacuum suction. The glass-wiping device sucks onto the surface of the glass via the inner negative pressure chamber (13) and/or the outer negative pressure chamber (14). The glass-wiping device sucks onto the surface of the glass via the suction apparatus, is capable of ensuring sufficient vacuum pressure, and prevents the phenomenon of the glass-wiping device falling from the surface of the glass.

24 Claims, 3 Drawing Sheets

(56) References Cited

FOREIGN PATENT DOCUMENTS

| | | |
|---|---|---|
| CN | 201506669 | 6/2010 |
| CN | 102009707 | 4/2011 |
| CN | 202537391 | 11/2012 |
| CN | 202669947 | 1/2013 |
| EP | 1559358 A1 | 3/2002 |
| JP | 06-190747 A | 7/1994 |
| RU | 1771958 | 10/1992 |
| WO | WO 2008096974 | 8/2008 |

OTHER PUBLICATIONS

International Search Report mailed Jul. 11, 2013 which issued in corresponding International Patent Application No. PCT/CN2013/073700 (8 pages).

* cited by examiner

GLASS-WIPING DEVICE HAVING A SUCTION APPARATUS

FIELD OF THE INVENTION

The present invention belongs to the technical field of small household appliances, and particularly relates to a suction apparatus and a glass-wiping device having the suction apparatus.

BACK GROUND OF THE PRIOR ART

In daily life, the wiping rags are generally used to wipe and clean small pieces of glass, while rod-type glass cleaning wipe is generally used to wipe and clean big pieces of glass and the external facade of a window. However, in the process of wiping glass by using a rod-type glass-cleaning wipe, the arms of person may easily get tired. In view of this problem, a window-cleaning device with single suction cup which has been available in the market can clean glass curtain wall at high level. Such window-cleaning device adheres onto vertical wall surface with a vacuum suction cup and is designed to move through independently driving by wheel or track. However, the above-mentioned single-sided window-cleaning device has such defect that the leakage of sealing gas is inevitable since the vacuum chamber of the device and the wall surface are in the status of sliding friction in the rolling process of wheels. In case of excessive gas leakage, no sufficient vacuum pressure is ensured and the single-sided window-cleaning device will fall off from wall surface. In addition, in the rolling process of wheels, the suction cup will be jacked up by small bumps and gas in the vacuum chamber will leak when the wheel contacts such small bumps. If gas leaks excessively, sufficient vacuum pressure cannot be ensured and the single-sided window-cleaning device will fall off from wall surface as well.

SUMMARY OF THE INVENTION

With view of the deficiency of the prior art, the present invention intends to provide a suction apparatus and a glass-wiping device having the suction apparatus capable of ensuring sufficient vacuum pressure to prevent the glass-wiping device from falling from the surface of the glass.

The present invention is achieved through the following technical solution:

A suction apparatus comprises a suction cup unit 1. The suction cup unit 1 comprises an inner suction cup 11 and an outer suction cup 12, the inner suction cup 11 is provided on the inside of the outer suction cup 12, wherein a cavity on the inside of the inner suction cup 11 forms an inner negative pressure chamber 13 via vacuum suction, and a cavity between the inner and outer suction cups forms an outer negative pressure chamber 14 via vacuum suction.

A glass-wiping device with a suction apparatus comprises a moving unit 2, a cleaning unit 3, a driver unit 4, a control unit 5 and the suction apparatus, wherein the moving unit 2 and the cleaning unit 3 are provided at the bottom of the glass-wiping device 8, the control unit 5 is connected to the driver unit 4 and the cleaning unit 3, the driver unit 4 controls the moving of the moving unit 2 under control of the control unit 5; the glass-wiping device adheres onto the surface of the glass via the suction apparatus including a suction cup unit 1. The suction cup unit 1 comprises an inner suction cup 11 and an outer suction cup 12, the inner suction cup 11 is provided on the inside of the outer suction cup 12, wherein a cavity on the inside of the inside of the inner suction cup 11 forms an inner negative pressure chamber via vacuum suction, and a cavity between the inner and outer suction cups forms an outer negative pressure chamber through vacuum suction.

That is, when only the inner suction cup 11 is sealed with the surface of the glass, the glass-wiping device adheres onto the surface of the glass via the inner negative pressure chamber 13; when only the outer suction cup 12 is sealed with the surface of the glass, the inner negative pressure chamber 13 is communicated with the outer negative pressure chamber 14 to form a big negative pressure chamber, and the glass-wiping device adheres onto the surface of the glass via the big negative pressure chamber; when both of the inner suction cup 11 and the outer suction cup 12 are sealed with the surface of the glass, the glass-wiping device adheres onto the surface of the glass via the inner negative pressure chamber 13 and the outer negative pressure chamber 14.

the vacuum degree of the inner negative pressure chamber is equal to or greater than that of the outer negative pressure chamber.

Furthermore, the suction apparatus also comprises a vacuum pump and gas-guide tubes, wherein the inner suction cup 11 and the outer suction cup 12 are respectively connected to the vacuum pump through the gas-guide tubes.

The suction apparatus comprises a vacuum pump and a gas-guide tube, wherein the inner suction cup 11 is connected to the vacuum pump through the gas-guide tube.

When only the inner suction cup 11 is sealed with the surface of the glass, the glass-wiping device adheres onto the surface of the glass via the inner negative pressure chamber 13; when only the outer suction cup 12 is sealed with the surface of the glass, the inner negative pressure chamber 13 is communicated with the outer negative pressure chamber 14 to form a big negative pressure chamber, and the glass-wiping device adheres onto the surface of the glass via the big negative pressure chamber.

The inner negative chamber 13 is positioned in a closed space enclosed by the inner suction cup 11, the bottom base of the glass-wiping device and the glass; the outer negative pressure chamber 14 is positioned in a closed space enclosed by the inner suction cup 11, the outer suction cup 12, the bottom case of the glass-wiping device and the glass. Alternatively, the inner negative chamber 13 is positioned in a closed space enclosed by the inner suction cup 11 and the glass; the outer negative pressure chamber 14 is positioned in a closed space enclosed by the inner suction cup 11, the outer suction cup 12 and the glass.

The inner suction cup 11 and the outer suction cup 12 are coaxially arranged.

DESCRIPTION OF ATTACHED DRAWINGS

Figure 1:
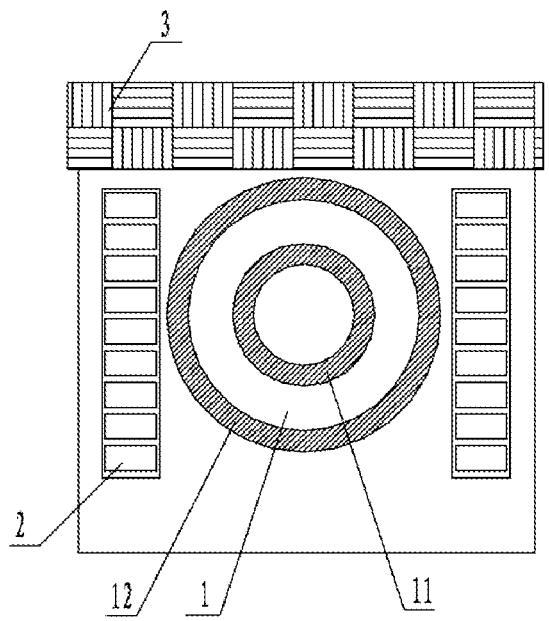
FIG. 1 is a schematic diagram of the structure of the glass-wiping device having the suction apparatus provided by the present invention.
Figure 2:
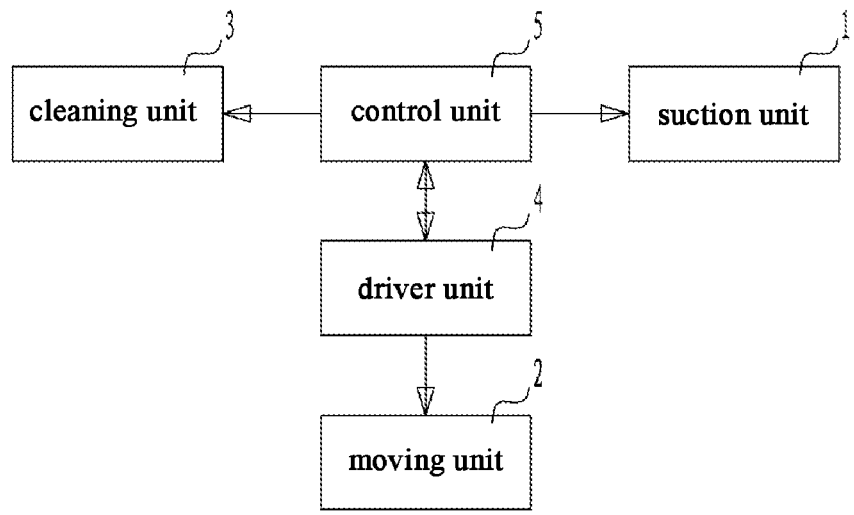
FIG. 2 is a schematic diagram showing the control of the glass-wiping device having the suction apparatus provided by the present invention.

| Reference Signs List | | | |
|---|---|---|---|
| 1. Suction unit | 2. Moving unit | 3. Cleaning unit | 4. Driver unit |
| 5. Control unit | 6. Glass | 7. Small bump | 8. Glass-wiping device |
| 11. Inner suction cup | | 12. Outer suction cup | |
| 13. Inner negative pressure chamber | | 14. Outer negative pressure chamber | |

DETAILED DESCRIPTION OF PREFERRED EMBODIMENTS

The suction apparatus of the present invention comprises a suction cup unit 1 including two suction cups, namely, an inner suction cup 11 and an outer suction cup 12. The inner suction cup 11 is arranged on the inside of the outer suction cup 12. The cavity on the inside of the inner suction cup 11 forms an inner negative pressure chamber 13 via vacuum suction, the cavity between the inner and outer suction cups forms an outer negative pressure chamber 14 via vacuum suction. The inner and the outer suction cups are connected to a vacuum pump via suction tubes respectively. Alternatively, only the inner suction cup 11 is connected to a vacuum pump via a suction tube, though the suction effect may be comparatively poor.

Figure 3:
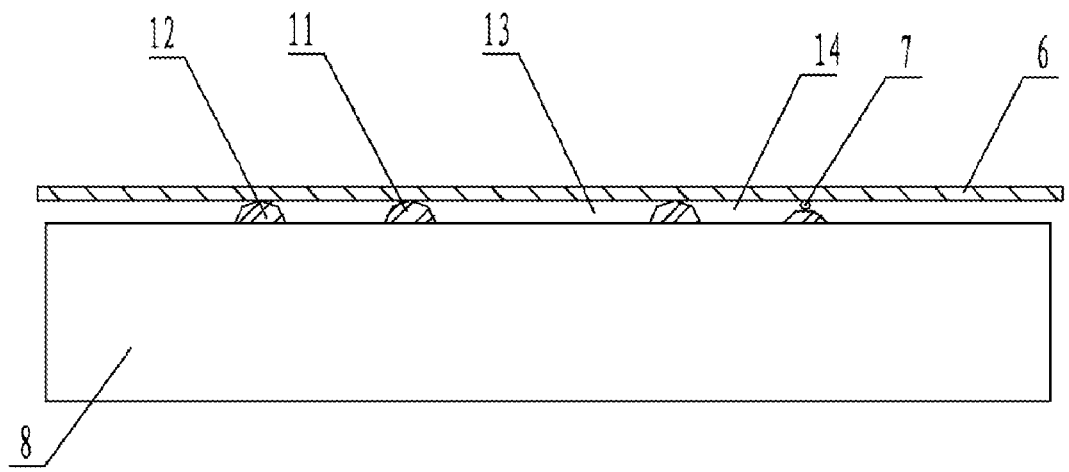
FIGS. 3-6 are schematic diagrams illustrating the operating principle of the suction apparatus provided by the present invention.
Figure 4:
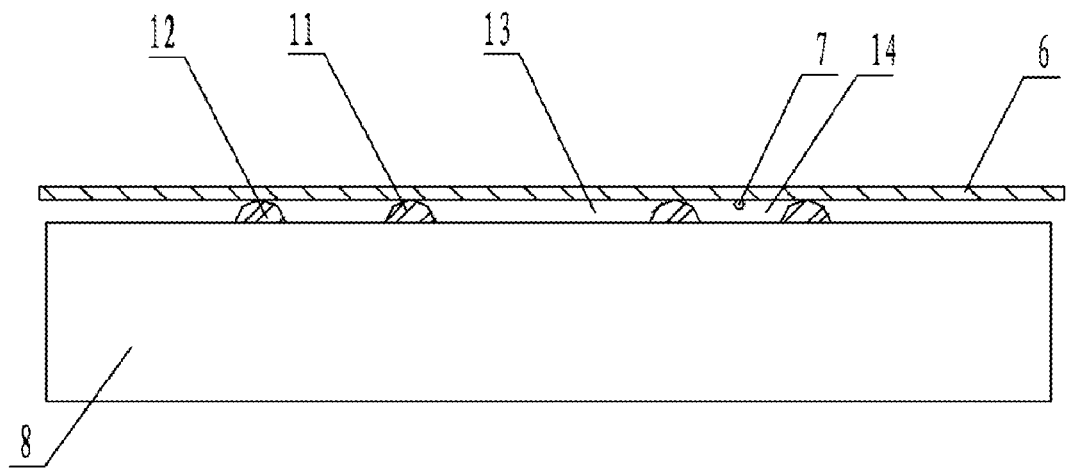
Figure 5:
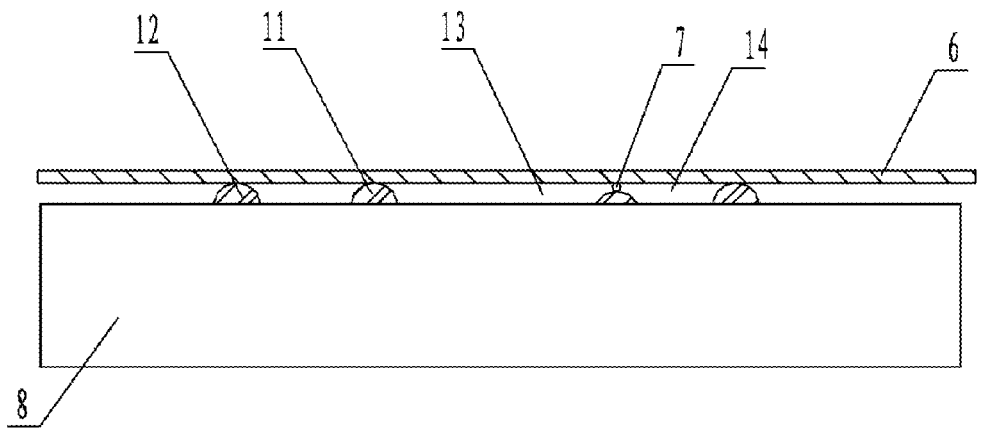

The glass-wiping device adheres onto the surface of the glass via the inner negative pressure chamber 13 and/or the outer negative pressure chamber 14. That is to say, when only the inner suction cup 11 is sealed with the surface of the glass, the glass-wiping device adheres onto the surface of the glass via the inner negative pressure chamber 13, as shown in FIG. 3; when only the outer suction cup 12 is sealed with the surface of the glass, the inner negative pressure chamber 13 is communicated with the outer negative pressure chamber 14 to form a big negative pressure chamber, by which the glass-wiping device is adhered onto the surface of glass, as shown in FIG. 5; when both of the inner suction cup 11 and the outer suction cup 12 are sealed with the surface of the glass, the glass-wiping device adheres onto the surface of the glass via both of the inner negative pressure chamber 13 and the outer negative pressure chamber 14, as shown in FIG. 4.

The vacuum degree of the inner negative pressure chamber is equal to or greater than that of the outer negative pressure chamber.

The formation of the negative pressure chamber lies on the structure of the suction cup itself. If one end face of the suction cup is sealed, the suction cup can form a sealing chamber only in combination with the surface of the glass. By contrast, if both end faces of the suction cup are not sealed, the suction cup is required to be sealed and connected with the bottom case of the glass-wiping device to form an end-face sealing and then forms a sealed chamber in combination with the surface of the glass. To be specific, if the suction cup is embedded in the bottom case of the glass-wiping device, the inner negative pressure chamber 13 is positioned in a closed space enclosed by the inner suction cup 11, the bottom case of the glass-wiping device and the glass; the outer negative pressure chamber 14 is position in a closed space enclosed by the inner suction cup 11, the outer suction cup 12, the bottom case of the glass-wiping device as well as the glass. If one end face of the suction cup is sealed, the inner negative pressure chamber 13 is positioned in a closed space enclosed by the inner suction cup 11 and the glass, while the outer negative pressure chamber 14 is positioned in a closed space enclosed by the inner suction cup 11, the outer suction cup 12 and the glass.

In normal operating state, a negative pressure state is maintained in the inner suction cup by the action of a vacuum pump. That is, the cavity on the inside of the inner suction cup 11 forms the inner negative pressure chamber 13 via vacuum suction. Such negative pressure state is also maintained between the inner suction cup and the outer suction cup, namely, the cavity between the inner suction cup and the outer suction cup forms the outer negative pressure chamber 14 via vacuum suction. Accordingly, the glass-wiping device firmly adheres onto the glass and moves on the glass.

When the glass-wiping device runs into small bumps 7 on the glass 6, the operating principle of the suction apparatus of the present invention is shown in FIGS. 3-6.

As shown in FIG. 3, when the glass-wiping device runs into small bumps 7 on the glass 6, the inner suction cup 11 is still in normal operating state, while the outer suction cup 11 is jacked up by small bumps 7 and thus fails to work. In such case, the glass-wiping device adheres onto the surface of the glass via the inner negative pressure chamber 13 and thus can keep the state of adhering onto the glass 6.

As shown in FIG. 4, when the glass-wiping device 8 keeps moving and small bumps 7 enter into the outer negative pressure chamber 14, the outer negative pressure chamber 14 quickly restores to the negative pressure state by the action of vacuum pump, and the outer suction cup 12 adheres onto the glass 6 again. In such case, the glass-wiping device 8 adheres onto the glass of the surface via both of the inner negative pressure chamber 13 and the outer negative pressure chamber 14, and the glass-wiping device keeps moving.

As shown in FIG. 5, if small bumps 7 jack up the inner suction cup 11, the inner suction cup 11 fails to work. However, in this case, the outer suction cup 12 still maintains the normal operating state, and the inner negative pressure chamber and the outer negative pressure chamber communicate with each other and form a big negative pressure chamber together. The glass-wiping device therefore adheres onto the surface of the glass via the big negative pressure chamber.

Figure 6:
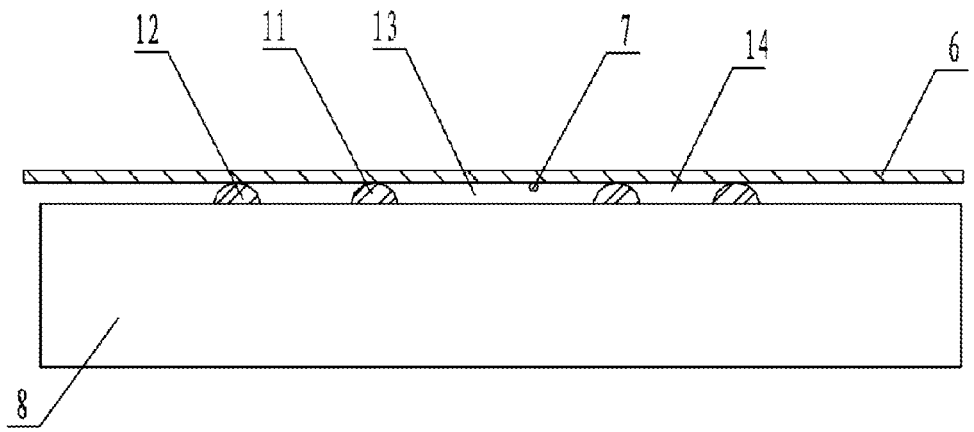

As shown in FIG. 6, after the small bumps 7 enters into the inner negative pressure chamber 13, both of the inner suction cup 11 and the outer suction cup 12 operate normally, the glass-wiping device 8 adheres onto the surface of the glass via both of the inner negative pressure chamber 13 and the outer negative pressure chamber 14, and the glass-wiping device returns to a typical moving mode again.

The invention claimed is:

1. A glass-wiping device with a suction apparatus, comprising a moving unit (2), a cleaning unit (3), a driver unit (4), a control unit (5) and the suction apparatus, wherein the moving unit (2) and the cleaning unit (3) are provided at the bottom of the glass-wiping device (8), the control unit (5) is connected to the driver unit (4), the driver unit (4) controls the moving of the moving unit (2) under control of the control unit (5); the glass-wiping device adheres onto the surface of the glass via the suction apparatus including a suction cup unit (1), characterized in that, the suction cup unit (1) comprises an inner suction cup (11) and an outer suction cup (12), the inner suction cup (11) is provided on the inside of the outer suction cup (12), wherein a cavity on the inside of the inside of the inner suction cup (11) forms an inner negative pressure chamber via vacuum suction, and a cavity between the inner and outer suction cups forms an outer negative pressure chamber via vacuum suction.

2. The glass-wiping device of claim 1, characterized in that, the glass-wiping device adheres onto the surface of the glass via the inner negative pressure chamber (13) and/or the outer negative pressure chamber (14).

3. The glass-wiping device of claim 2, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

4. The glass-wiping device of claim 2, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

5. The glass-wiping device of claim 2, characterized in that, the inner suction cup (11) and the outer suction cup (12) are coaxially arranged.

6. The glass-wiping device of claim 1, characterized in that, the vacuum degree of the inner negative pressure chamber is equal to or greater than that of the outer negative pressure chamber.

7. The glass-wiping device of claim 6, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

8. The glass-wiping device of claim 6, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

9. The glass-wiping device of claim 6, characterized in that, the inner suction cup (11) and the outer suction cup (12) are coaxially arranged.

10. The glass-wiping device of claim 1, characterized in that, the suction apparatus also comprises a vacuum pump and gas-guide tubes, wherein the inner suction cup (11) and the outer suction cup (12) are respectively connected to the vacuum pump through the gas-guide tubes.

11. The glass-wiping device of claim 10, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

12. The glass-wiping device of claim 10, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

13. The glass-wiping device of claim 10, characterized in that, the inner suction cup (11) and the outer suction cup (12) are coaxially arranged.

14. The glass-wiping device of claim 1, characterized in that, the suction apparatus also comprises a vacuum pump and a gas-guide tube, wherein the inner suction cup (11) is connected to the vacuum pump through the gas-guide tube.

15. The glass-wiping device of claim 14, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

16. The glass-wiping device of claim 14, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

17. The glass-wiping device of claim 14, characterized in that, the inner suction cup (11) and the outer suction cup (12) are coaxially arranged.

18. The glass-wiping device of claim 1, characterized in that, when only the inner suction cup (11) is sealed with the surface of the glass, the glass-wiping device adheres onto the surface of the glass via the inner negative pressure chamber (13); when only the outer suction cup (12) is sealed with the surface of the glass, the inner negative pressure chamber (13) is communicated with the outer negative pressure chamber (14) to form a big negative pressure chamber, and the glass-wiping device adheres onto the surface of the glass via the big negative pressure chamber.

19. The glass-wiping device of claim 18, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

20. The glass-wiping device of claim 18, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

21. The glass-wiping device of claim 18, characterized in that, the inner suction cup (11) and the outer suction cup (12) are coaxially arranged.

22. The glass-wiping device of claim 1, characterized in that, the inner negative chamber (13) is positioned in a closed space enclosed by the inner suction cup (11), the bottom base of the glass-wiping device and the glass; the outer negative pressure chamber (14) is positioned in a closed space enclosed by the inner suction cup (11), the outer suction cup (12), the bottom case of the glass-wiping device and the glass.

23. The glass-wiping device of claim 1, characterized in that, the inner negative chamber (13) is positioned in a closed space enclosed by the inner suction cup (11) and the glass; the outer negative pressure chamber (14) is positioned in a closed space enclosed by the inner suction cup (11), the outer suction cup (12) and the glass.

24. The glass-wiping device of claim 1, characterized in that, the inner suction cup (11) and the outer suction cup (12) are coaxially arranged.

\* \* \* \* \*